United States Patent [19]

Williams

[11] Patent Number: 5,116,395

[45] Date of Patent: May 26, 1992

[54] DUST COLLECTION WITH PROGRAMMABLE CLEANING AIR CONTROL

[75] Inventor: Roger D. Williams, Dallas, N.C.

[73] Assignee: Pneumafil Corporation, Charlotte, N.C.

[21] Appl. No.: 727,648

[22] Filed: Jul. 9, 1991

[51] Int. Cl.⁵ .............................................. B01D 46/00
[52] U.S. Cl. ........................................ 55/273; 55/283; 55/302; 55/294
[58] Field of Search ................... 55/272, 273, 294, 283

[56] References Cited

U.S. PATENT DOCUMENTS

| | | | |
|---|---|---|---|
| 2,974,748 | 3/1961 | Swanson | 55/294 |
| 3,277,633 | 10/1966 | Smoot | 55/294 |
| 3,487,609 | 1/1970 | Caplan | 55/294 |
| 4,157,899 | 6/1979 | Wheaton | 55/273 |
| 4,218,227 | 8/1980 | Frey | 55/302 |
| 4,409,009 | 10/1983 | Lissy | 55/302 |
| 4,655,799 | 4/1987 | Bosworth et al. | 55/294 |

FOREIGN PATENT DOCUMENTS 3203112  8/1983  Fed. Rep. of Germany.
3420211 12/1985  Fed. Rep. of Germany.
  84314  9/1971  German Democratic Rep..

OTHER PUBLICATIONS

Tech Air, "Filter for Dust and Air Pollution Control," Jan. 1, 1977.
Knowlton J. Caplan, "The CS Filter—A New High-Performance Cloth Arrestor," Nov. 1967, pp. 567–572.
Pneumafil Corporation, "The Pneumafil Straight Fire Filter," Jan. 1, 1986.

Primary Examiner—Bernard Nozick
Attorney, Agent, or Firm—Shefte, Pinckney & Sawyer

[57] ABSTRACT

Apparatus for filtering or collecting dust or other particulate matter which includes a plurality of filter elements that must be cleaned at periodic intervals by emitting a burst of cleaning air into the interior of the filter element so that it flows in a reverse direction to the normal flow of the transport air to remove particulate matter accumulated on the surface of the filter element. The cleaning air is emitted from a plurality of nozzles mounted on a horizontal arm that rotates above the filter elements, and each nozzle is provided with its own valve which can be opened to connect the nozzle to a source of pressurized cleaning air. A microprocessor is programmed to receive a reference signal when the horizontal arm reaches a predetermined point in its movement, after which the microprocessor is programmed to operate each of the valves in a predetermined sequence and at a predetermined timed frequency.

19 Claims, 6 Drawing Sheets

DUST COLLECTION WITH PROGRAMMABLE CLEANING AIR CONTROL

BACKGROUND OF THE INVENTION

This invention relates generally to apparatus for filtering large quantities of transport air having dust or other foreign matter entrained thereon by passing said transport air through a plurality of self-cleaned filter elements, such as filter bags made from an appropriate fabric.

Filters or dust collectors of the foregoing type typically use, as the filtering elements, large bags made from any suitable fabric, such as, for example, 16-ounce polyester felt with nylon scrim reinforcement, or pleated paper filter cartridges. The transport air is passed through the filtering elements, usually from the outside of the bag to the inside, and deposits the entrained dust or foreign matter on the surface of the filtering element, after which the cleaned air is transported away from the dust collector. After a period of time, the length of which depends on many variables, the dust collected on the exterior surface of the filter elements will accumulate to a point at which is must be removed for proper continuing operation of the dust collector, and therefore these dust collectors are provided with some type of arrangement for periodically cleaning the filter elements, usually by the use of a flow of air or air pulse that is transmitted back through the filter elements in a direction opposite to the normal flow of the transport air, whereby the accumulated dust particles are moved outwardly from the surface of the filter element and caused to gradually migrate downwardly until they are removed from the filter element altogether for ultimate removal from the dust collector.

In most of the dust collectors of this type, the filtering elements are mounted on a partition plate to depend downwardly therefrom, and the partition plate is provided with an opening for each filter which permits the cleaned air to flow upwardly through the opening in the partition plate to a clean air chamber located above the partition plate. The apparatus used to clean the filter may take a variety of forms, but it typically includes either a fixed nozzle disposed above and adjacent each opening in the partition plate, or a movable member that is designed to pass over the plurality of partition plate openings and cause the cleaning air to flow through such openings and into the center of the filter.

In typical apparatus of the first type, which is used most often in dust collectors that use cylindrical pleated paper filter elements, a venturi is fixed above the center of each partition plate opening together with a pipe that extends above each venturi with apertures formed in the pipe for periodically emitting a pulse of pressurized air into the venturi which creates a momentary pulse of cleaning air within the filter that passes outwardly therethrough to clean the exterior surface thereof. Typical examples of this type of cleaning apparatus are disclosed in Frey U.S. Pat. No. 4,218,227 and Lissy U.S. Pat. No. 4,409,009.

Where a movable member is used to distribute the cleaning air to the filter, it is usually in the form of a radially extending arm mounted for rotational movement just above the partition plate, and having a plurality of jets or apertures formed therein for directing a flow of air downwardly into the filter through the openings in the partition plate. In most of these dust collectors, the jets or apertures in the moving arm are arranged to correspond in some manner with the pattern of openings in the partition plate, and in some instances cleaning air is discharged from the moving arm in a random manner that is determined by the predetermined pressure buildup across the filter, as disclosed for example in Caplan U.S. Pat. No. 3,487,609, Swanson U.S. Pat. No. 2,974,748 and Smoot U.S. Pat. No. 3,227,633. In another variation, Bosworth U.S. Pat. No. 4,655,799 discloses a dust collector in which the openings in the circular partition plate (and therefore the filters) are arranged in a plurality of contiguous pie shaped segments, each segment having exactly the same pattern of openings therein. The movable arm has jets which are also disposed in exactly the same pattern as the openings in each pie-shaped segment, and a proximity sensor and a counter are utilized together to determine when the jets in the movable arm are directly above a selected one of the pre-shaped segments, whereupon a solenoid is operated to open a valve that connects the jets to a source of pressurized cleaning air and all of the jets exert a blast of air into each of the corresponding openings in the selected pie-shaped segment.

The dust collectors described above which include randomly fired jets of cleaning air are relatively inefficient because there is no way to insure that the jets will be fired when they are centered over a filter, and it is entirely possible that some bags will remain uncleaned for substantial lengths of time, all of which creates higher pressure drops across the filters, increased demands on the total fan system and higher energy costs. In the dust collectors which include cams or other arrangements for firing the cleaning air jets when they are properly positioned above a corresponding pattern of partition plate openings, improved operating efficiency results, but they still have some drawbacks. For example, when the jets in the movable arm are located in a straight line along its radially extending length, the openings in the partition plate must also be arranged in radial lines extending from the center of the partition plate, and this pattern reduces significantly the number of openings, and therefore the number of filters, that can be employed, particularly where the partition plate has a large diameter and the radially outermost openings in each radial line are substantially spaced from one another in an angular direction. While the particular pattern of openings utilized in the aforesaid Bosworth patent overcomes this disadvantage to some extent, there is still a problem of not making maximum utilization of the entire space available for openings on the partition plate. Moreover, in most of the above-described positively fired dust collectors, all of the jets in the movable arm are fired each time the control valve is opened, which can result in inefficiency if all of the filters are being cleaned at the same time intervals even though some of the filters become dirty with different frequencies, such as may be the case, for example, when the radially outermost filters are nearest the dirty air inlet of the dust collector and will therefore tend to accumulate dust more rapidly than the filters which are closer to the center of the partition plate.

By contrast, the filtering apparatus of the present invention overcomes or alleviates the aforesaid drawbacks of known filter apparatus, and provides an electronic control means which can be programmed to selectively vary the sequence and frequency at which the jets of cleaning air are operated.

SUMMARY OF THE INVENTION

In accordance with the present invention, a dust collector or filtering apparatus is provided for filtering particulate matter and the like entrained in a transport fluid such as air, the apparatus comprising a housing that is divided by a partition plate into a dirty fluid chamber and a clean fluid chamber, such partition plate having a plurality of openings therein and a tubular filter element depending from each opening into the dirty fluid chamber. The housing also includes an inlet to the dirty air chamber and an outlet from the dirty air chamber, whereby the transport fluid will flow into the dirty air chamber, through the filter elements to deposit the particulate matter on the exterior surfaces thereof, and then outwardly from the clean air chamber. An arrangement is provided for cleaning the filter elements at predetermined intervals, and this arrangement includes a plurality of nozzles mounted for movement across the partition plate for directing a jet of cleaning air into and through the openings in the partition plate and into the tubular filter elements to create a backflow of cleaning fluid therethrough. A source of pressurized fluid is provided, and a plurality of electrically operated valves are provided for selectively connecting the source of cleaning fluid to the nozzles. A control system is provided for operating the valves to connect the source of pressurized fluid to the nozzles at predetermined intervals to form said jets of cleaning air, such control means including a sensor for generating an output signal when the nozzles reach a preselected reference point during the aforesaid movement of the nozzles over the partition plate, and a programmable electronic operating means for receiving the output signal and generating a plurality of electrical control signals that are transmitted to the plurality of electrically operated valves to operate the valves in a preprogrammed sequence to cause the plurality of nozzles to be operated in a predetermined sequence and to cause at least some of said nozzles to be operated at different frequencies, whereby the nozzles will produce jets of cleaning air as they pass over selected ones of the openings in the partition plate during the movement of the nozzles over the partition plate.

In the preferred embodiment of the present invention, the particular plate is circular and the openings in the partition plate are arranged in annular patterns, and the nozzles are mounted for rotational movement across the top surface of the partition plate so that one of the nozzles passes over each of the openings in the partition plate once during each 360 rotation of the nozzles. Also, each nozzle preferably includes a pair of legs or jets that are adjacent one another at a predetermined spacing, and the openings in the partition plate are arranged in consecutive pairs located in concentric annular rings, and with each pair of openings having the same spacing therebetween as the aforesaid spacing between the pair of nozzle jets. Additionally, it is preferred that the center of one opening in each of the consecutive pairs of openings be equidistant from the center of the other opening in that pair and from the center of one of the openings in the next consecutive pair of openings.

Preferably, the control system includes a plurality of reference points, each corresponding to an equal arcuate segment of the circular partition plate so that the sensor will generate a plurality of output signals during each 360° rotational movement of the nozzle across the partition plate, and the programmable electronic control means generates a plurality of control signals in the aforesaid predetermined sequence each time one of the output signals is received.

Also, in the preferred embodiment of the present invention, the nozzles are carried on a support arm that extends generally diametrically across the partition plate for rotation about an axis of rotation extending vertically through the center of the partition plate, and some of the nozzles are carried on the support on one side of the axis of rotation and some are carried on the other side thereof. The source of pressurized fluid is contained within the confines of the support itself, and each of the valves are disposed between the support and a pair of nozzles for controlling the flow of pressurized fluid to the associated pair of nozzles.

The programmable control system may be programmed to transmit the aforesaid operating signals to the valves each time they pass over each opening in the partition plate, or it may be programmed to transmit an operating signal each time a nozzle passes over a predetermined number of openings in the partition plate. In an alternate embodiment of the present invention, the control system may include a sensor for sensing the velocity pressure adjacent a filter element and generating an output signal when such velocity pressure has reached a predetermined maximum value, and this velocity pressure sensor is mounted for movement immediately ahead of at least one of the nozzles so that the programmable control system can be programmed to operate the valve for that nozzle each time it passes over one of the filter elements which caused the output signal to be generated by the sensor.

DESCRIPTION OF THE PREFERRED EMBODIMENT

Figure 1:
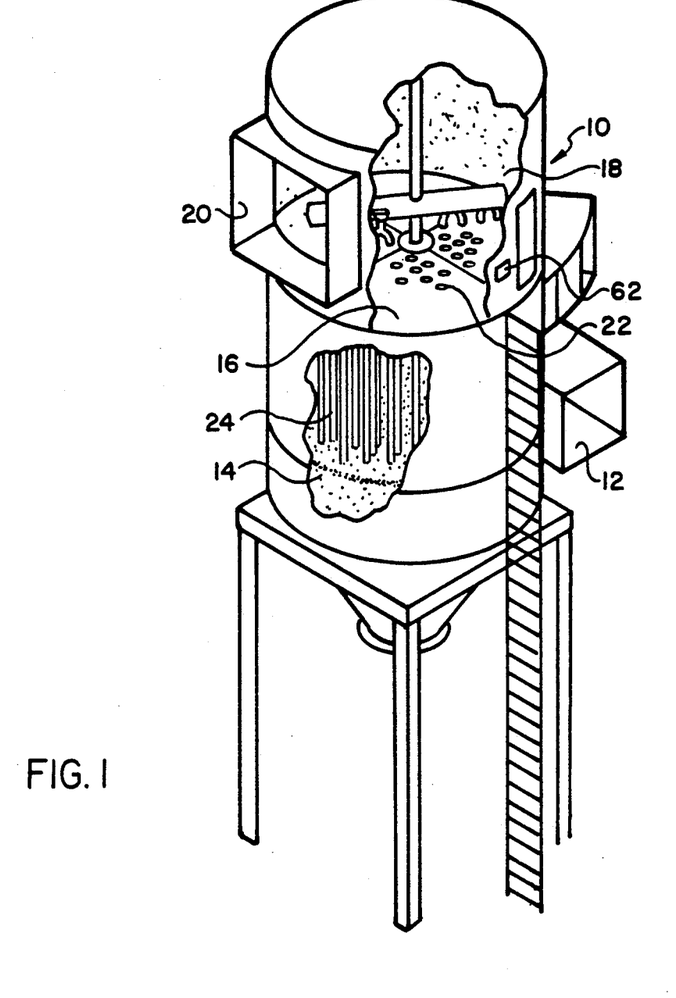
FIG. 1 is a perspective view of the filtering apparatus of the present invention.

Looking now in greater detail at the accompanying drawings, FIG. 1 illustrates, in a diagrammatic perspective view, a dust collector 10 embodying the present invention. The dust collector 10 includes an inlet 12 through which transport air having entrained dust particles or the like is introduced into a lower dirty air chamber 14 located beneath a partition plate 16, and a clean air chamber 18 is located above the partition plate 16 and is formed with an outlet 20. The partition plate includes a large plurality of openings 22 arranged in a predetermined pattern, all as discussed in greater detail below, and a filter element 24 is mounted on the partition plate 16 at each opening 22 so as to depend downwardly therefrom. In the preferred embodiment of the present invention, these filter elements are tubular fabric filter bags made of polyester felt, but other forms of tubular filter elements can be used. In a manner well known to those skilled in the art, transport air having entrained dust particles or the like is caused to flow into the dirty air chamber 14 through the inlet 12, and the transport fluid then passes radially inwardly through the tubular filter bags 24 so that entrained particular matter is deposited on the exterior surface of the filter elements 24, and the cleaned transport air then flows upwardly from the center of the tubular filter elements 24, through the openings 22 into the clean air chamber 18, and then back into the air system through the outlet 20. It will be apparent that the particulate matter that is deposited on the exterior surface of the filter elements 24 will accumulate, and unless the filter elements 24 are periodically cleaned to continuously remove some of the accumulated particulate matter, the filter elements 24 will become inoperative.

Figure 2:
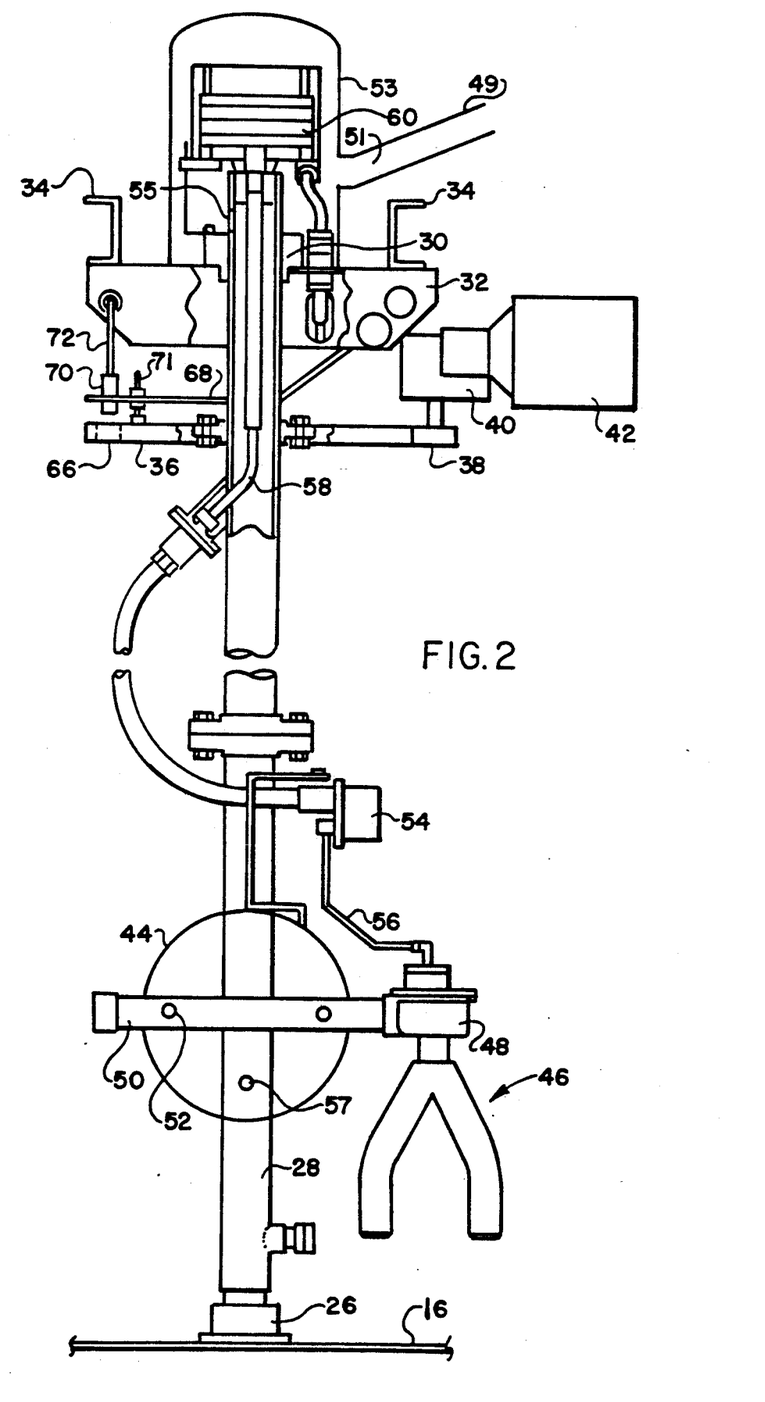
FIG. 2 is a vertical sectional view taken through the axis of the upper portion of the filter apparatus illustrated in FIG. 1.
Figure 3:
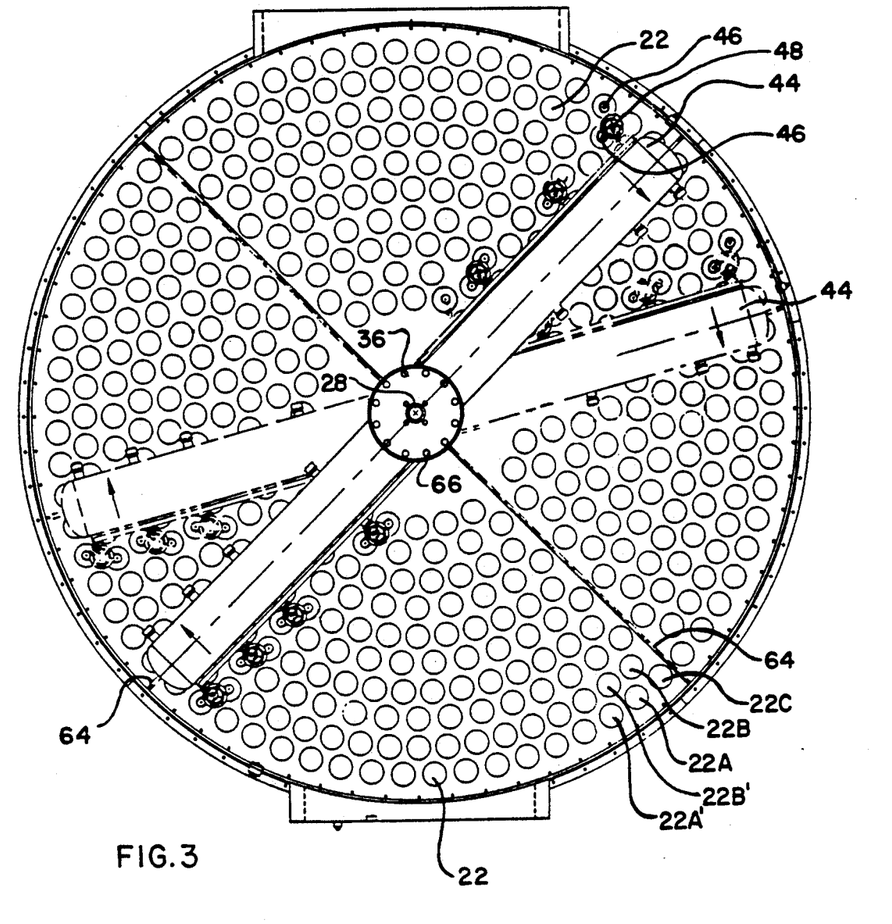
FIG. 3 is a top plan view of the upper portion of the filter apparatus illustrated in FIG. 1 taken along a horizontal reference plane.

As best seen in FIGS. 2 and 3, the dust collector 10 of the present invention is provided with a unique, versatile, and effective filter element cleaning arrangement that includes a lower bearing arrangement 26 that is mounted at the center of the circular partition plate 16 to rotatably support a tubular center post 28 that extends vertically with its axis extending through the center of the partition plate 16, and the upper end of the center post 28 is rotatably carried in an upper bearing arrangement 30 that is supported in a flange 32 mounted in the clean air chamber 18 by cross beams 34 extending across the clean air chamber 18. A gear plate 36 is fixed to the center post 28 with the outer periphery thereof formed as conventional gear teeth (not shown) for engagement with a drive gear 38 rotated by a speed reducer 40 that is, in turn, driven by an electric motor 42. Thus, operation of the motor 42 will cause rotation of the center post 28 about its central vertical axis.

A hollow, horizontally extending arm or header 44 is mounted on the center post 28 near the bottom end thereof, and, as best seen in FIG. 3, the arm 44 extends radially in both directions from the center of the partition plate 16 and diametrically thereacross for rotational movement with the center post 28. A plurality of bifurcated nozzles are carried at spaced locations along the extending length of the horizontal arm 44, each nozzle 46 being mounted on a valve 48 carried at the end of a conduit 50 that is mounted in, and extends through, the horizontal arm 44 (see FIG. 2). Each conduit 50 is formed with openings 52 therein so that the conduits are in fluid communication with the interior of the horizontal arm 44, whereby the source of pressurized air maintained within the horizontal arm 44 can be transmitted through the openings 52, the conduit 50, and the valves 48 to each of the nozzles 46 when the valve 48 is opened. Air is supplied to the horizontal arm from any suitable pump or other supply by transmitting it through a conduit 49 connected to an opening 51 in a sealed dome 53 mounted on the flange 32, and the interior of the sealed dome 53 is in communication with the interior of the tubular center post 28 through top openings 55 in the top portion thereof, and the bottom portion of the tubular center post 28 is, in turn, in communication with the interior of the horizontal arm 44 through bottom opening 57. Accordingly, supply air under pressure is pumped into the sealed dome 53 and passed into the interior of the horizontal arm 44 where it is maintained as a source of cleaning air that is replenished as necessary from the pump or other supply.

Each of the valves 48 is operated by a pilot valve 54 through a fluid connection 56, the pilot valve 54 being electrically controlled through an electrical line 58 that is mounted on the center post 28 and extends upwardly through the upper portion thereof to a conventional slip ring assembly that is mounted on the flange 32 and that permits rotational movement of the electrical line 58 with the rotating center post 28 while still being capable of transmitting electrical signals from a control panel 62 which may be mounted on the exterior wall of the dust collector 10 as illustrated in FIG. 1, or it may be located at any remote location so long as it can transmit control signals through an electrical line (not shown) to the slip ring assembly 60.

Figure 4:
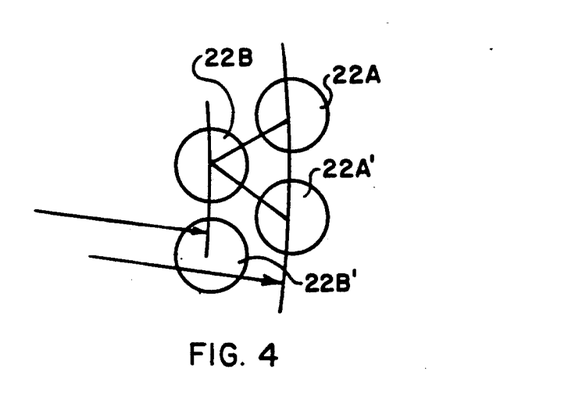
FIG. 4 is a detail view illustrating a portion of the pattern of the openings in the partition plate.

As best seen in FIG. 3, the partition plate 16 consists of four pie shaped quadrants connected together at four radially extending connection plates 64, and the openings 22 from which the filter elements 24 depend are arranged in a predetermined pattern that uniquely provides an excellent balance between two competing parameters in dust collectors of this type, namely the need to provide, on the one hand, as many filter elements as possible per square inch of partition plate so that a given capacity of transport air can be handled by as small a physical unit as possible, and, on the other hand, spacing the filter elements 24 from one another by a sufficient distance to avoid excessive reentrainment of the dust particles migrating from one filter element 24 to another during cleaning of the filter elements 24. In accordance with the present invention, the partition plate openings 22 are arranged in concentric annular rings, each ring consisting of two circular rows of openings 22 that are staggered with respect to one another. More specifically, the two rows of openings 22 in each annular ring are arranged so that one opening in one row forms a diagonal pair with an opening in the other row, and these pairs are arranged consecutively in the annular ring with each pair having an equal spacing from the next. Moreover, the arrangement of the openings 22 is such that the distance between the centers of two openings in a given diagonal pair is equal to the distance from the center of one of the openings in that pair to the center of the next adjacent opening 22. This pattern of the openings 22 is illustrated in FIGS. 3 and 4, where the outermost annular ring consists of the two radially outermost rows of openings 22, and where a first diagonal pair of openings are designated by the reference numerals 22A and 22B, and the next adjacent and consecutive pair of openings are indicated by the references numerals 22A' and 22B'. The annular spacing between each consecutive pair of openings 22 is identical, and, as shown in FIG. 4, the spacing between the centers of the paired openings 22A and 22B is equal to the spacing between the center of opening 22B and 22A'. This pattern of consecutive pairs extends equally throughout the entire annular extent of each pie-shaped quadrant of the partition plate 16, except for one opening 22C in each annular ring which does not have a paired opening because of the geometrical requirements of forming the partition plates into four equal quadrants, and it will also be noted that the same pattern of consecutive pairs of openings is found in different annular rings having progressively smaller diameters as the rings approach the center of the partition plate 16. Accordingly, the pattern of paired openings is the same in each of the five concentric rings having two circular rows of openings therein, and the number of openings in each of these five annular rings decreases as the diameter of the particular annular ring decreases. For example, in the particular embodiment of the present invention which is illustrated in FIG. 3, the outermost annular ring has 17 consecutive pairs of openings, whereas the innermost annular ring has only five. Finally, as best seen in FIG. 3, it will be noted that each of the bifurcated nozzles 46 are positioned on the horizontal arm 44 so that one leg or jet of the bifurcated nozzle 46 will pass over the outermost row of openings in a given annular ring, and the other leg of the bifurcated nozzle 46 will pass over the other row of openings in the same annular ring, the bifurcated nozzles 46 being arranged on a diagonal so that each of the bifurcated legs can be positioned simultaneously over each of the openings 22 in a given pair of openings as the horizontal arm rotates across the partition plate 16.

Figure 5:
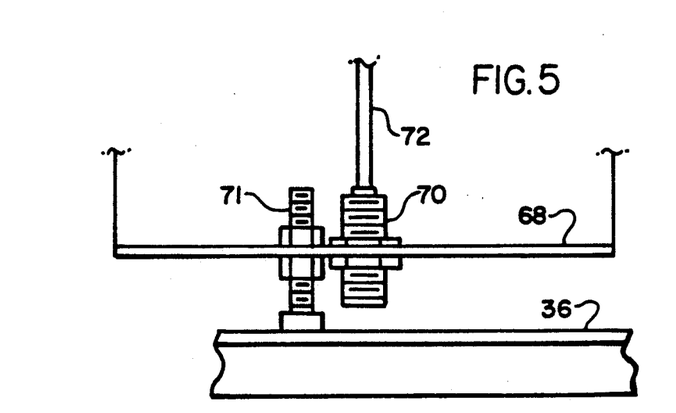
FIG. 5 is a detail view of the proximity sensor arrangements.

As best seen in FIGS. 2 and 3, the previously described gear plate 36 is formed with a plurality of apertures 66 disposed at equal arcuate spacings from one another along the periphery of the gear plate 36. In the illustrated embodiment of the present invention, there are 12 apertures 66 located at 30° angular spacings from one another. As best seen in FIGS. 2 and 5, a carrier plate 68 depends from the flange 32 and includes a horizontal leg that extends immediately above the gear plate 36 to support a proximity sensor 70 immediately above the circular row of apertures 66 in the gear plate 36, the proximity sensor 70 being positioned on the carrier plate 68 so that it will be aligned with the center of each aperture 66 as it passes beneath the proximity sensor 70 during rotation of the gear plate 36 and the center post 28. The proximity sensor 70 may be of any conventional type, and when it is aligned with the center of any one of the apertures 66 it will generate an electrical signal that is transmitted through an electrical line 72 to the control panel 62. Thus, since the apertures 66 are arranged with their centers at 30° spacings as described above, and since the gear plate 36 is fixed to the center post which is also fixed to the horizontal arm 44, the proximity sensor 66 will generate a reference signal each time the horizontal arm 44 has rotated through a 30° angle, this 30° angle being illustrated by the full line position of the horizontal arm and the dotted line position of the horizontal arm in FIG. 3. To maintain a proper spacing between the bottom face of the sensor 70 and the rotating gear plate 36, a guide member 71 having a nylon tip is mounted in the carrier plate 68 so that it slides along the top surface of the rotating gear plate 36. If desired, additional guide members 71 could be used, with some having slightly different depending lengths below the carrier plate 68 to provide back-up protection in the event the primary guide member 71 becomes worn or broken.

Figure 8:
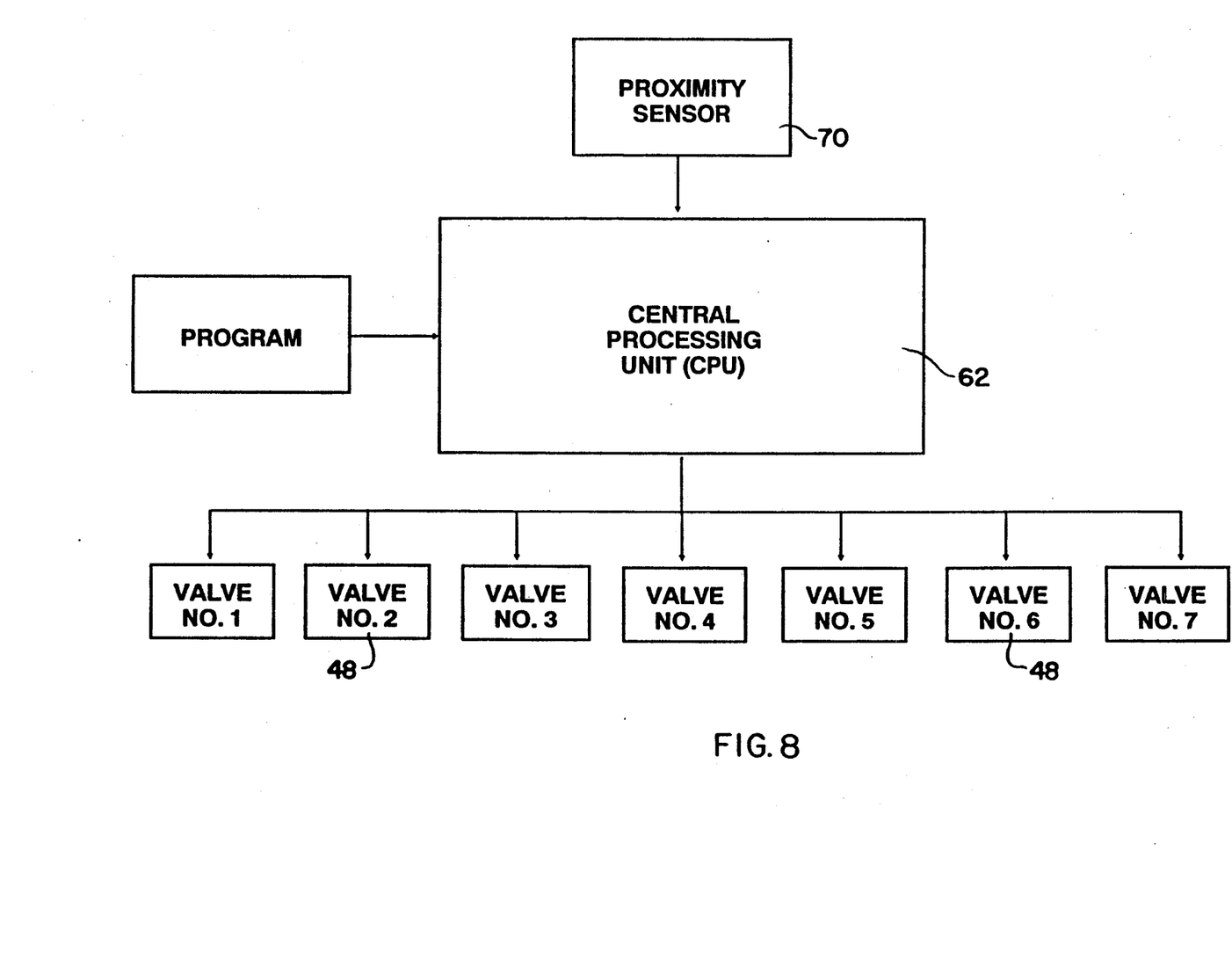
FIG. 8 is a block diagram illustrating the control system of the present invention.

The control panel 62 is provided with any suitable programmable microprocessor or central processing unit (CPU) that can be programmed to receive a reference signal from the proximity sensor 70 and generate operating control signals for each of the valves 48 in any predetermined sequence and at any predetermined frequency of operation, this control function being diagrammatically illustrated in FIG. 8. The details of the CPU form no part of the present invention, and while there are many microprocessors available which will perform the necessary programming function, one suitable microprocessor is a SYSMAC S6 microprocessor sold by Omron Electronics, Inc., in Schaunburg, Illinois. While the CPU can be programmed to vary the operation of the valves 48 over a wide range of options, some of which will be explained in greater detail below, FIG. 6 illustrates one typical program for operating the seven valves 48 shown in the illustrated embodiment of the present invention, and with this program the valves 48 are operated to emit a jet of cleaning air each time each valve 48 passes over an opening 22 in the partition plate 16 during rotation of the horizontal arm 44, whereby each filter element 24 is cleaned by such jet of cleaning air once during each 360° rotation of the horizontal arm 44.

Figure 6:
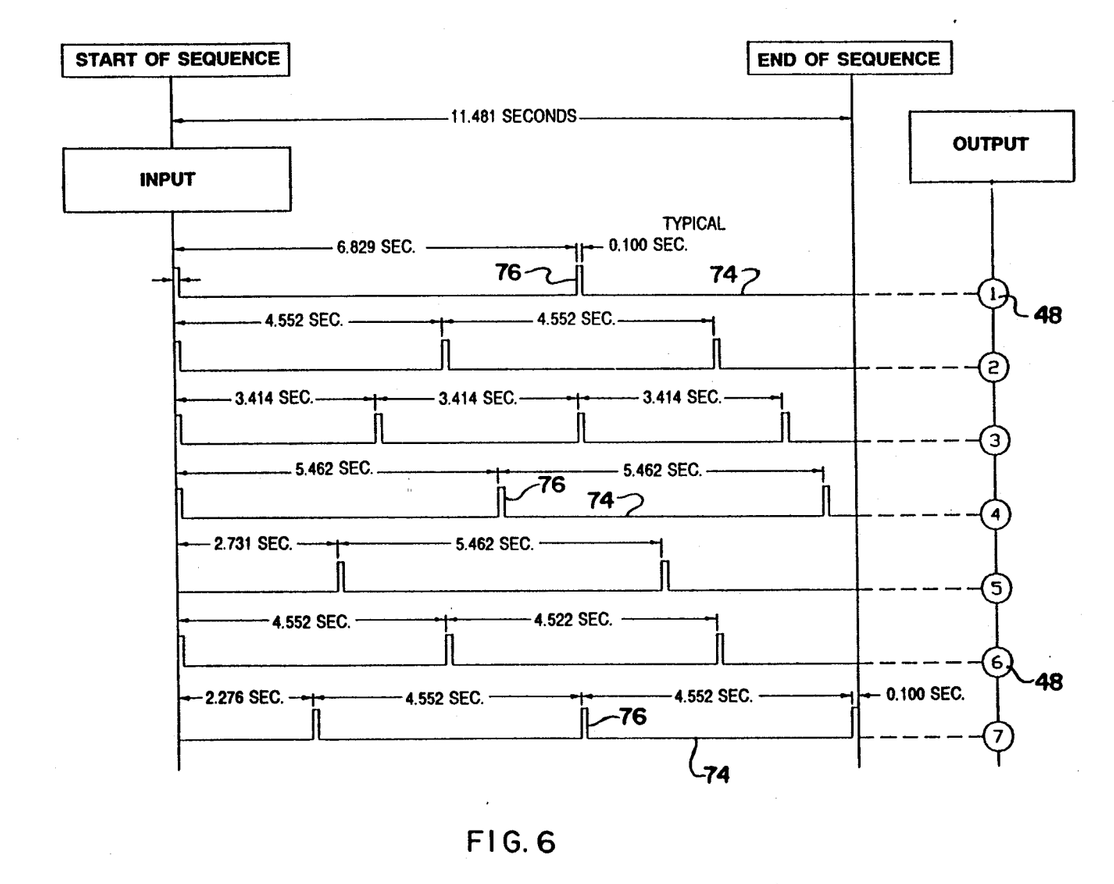
FIG. 6 is a chart showing one representative sequence of operation for the filter apparatus of the present invention.
Figure 7:
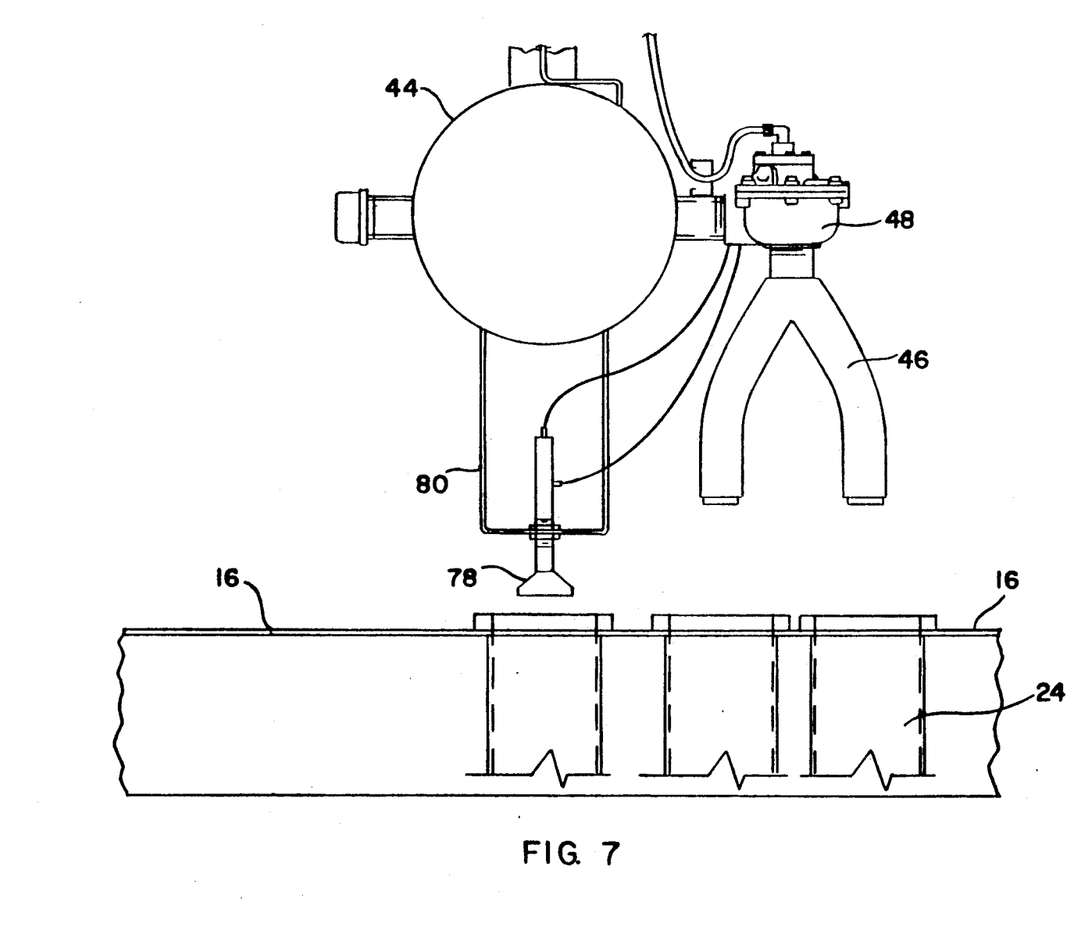
FIG. 7 is a detail view showing the location of the velocity pressure sensor that may be used in an alternate embodiment of the present invention.

More specifically, looking at FIGS. 3 and 6, the horizontal arm 44 is shown in full lines at a start position for a particular programmed sequence of operation, and in this position of the horizontal arm 44 one of the apertures 66 is directly beneath the proximity sensor 70 so that the proximity sensor 70 generates an output reference signal that is transmitted to the CPU in the control panel 62, and the CPU is programmed to immediately begin a sequence of operation at the point identified as "Start of Sequence" in FIG. 6. The operation of each of the seven valves 48 on the horizontal arm 44 is represented in FIG. 7 by a horizontal time line 74, and operation of a particular valve 48 is indicated by a pulse 76 on the horizontal time line to that valve. In looking simultaneously at FIGS. 3 and 6, it will be noted that the valves 48 are carried on the horizontal arm 44 at seven different positions, and these seven positions are indicated by the numerals in the right hand column in FIG. 6 and on the arm 44 in FIG. 3. It will also be noted that the outermost annular ring of paired openings 22 is passed over by two valve positions 6 and 7, and the next innermost annular ring of paired openings 22 is passed over by two valve positions 4 and 5. The next three annular rings of paired openings 22 are passed over by only one valve position, namely valve positions 3, 2, and 1, respectively.

Looking again at FIG. 6, the particular program represented is based on one revolution of the horizontal arm 44 taking approximately 2.7 minutes, and the entire sequence shown in FIG. 6 represents the operation of the seven valves 48 during movement of the horizontal arm 44 through a 30° arc. More specifically, when the horizontal arm 44 is in its full line position as shown in FIG. 3 and the proximity sensor 70 is directly over one of the apertures 66 and transmits a reference signal to the CPU in the control panel 62, this reference signal begins a programmed sequence as indicated at the left hand vertical line "Start of Sequence" line in FIG. 6. At this position, it will be noted that a pulse is shown at valve positions 1–4 and 6 with no pulse at valve positions 5 and 7. Thus, at the beginning of the predetermined sequence which is programmed into the CPU, the CPU will generate an output signal that is transmitted to each of the valves 48 at positions 1–4 and 6, and this output signal is transmitted through the slip ring assembly 60 to the pilot valve 54 at each of these valve positions, whereupon the valves 48 at each such position is momentarily opened and the pressurized air within the confines of the horizontal arm 44 passes through the conduit 50 and the valve 48, and then through both legs of the bifurcated nozzle 46 to emit a short blast of pressurized air therefrom which passes downwardly through the paired openings 22 beneath each of the activated nozzles 46 to clean the filter elements 24 in the manner well known in the art. It will be noted that at the "Start of Sequence" line in FIG. 6, the time lines 74 for valve positions 5 and 7 do not show a pulse 76, thereby indicating that the corresponding nozzles 46 at these two positions will not emit cleaning air therefrom. This is because each of the two outermost rings of paired openings have two nozzles 46 passing thereover, and it is only necessary to activate the two nozzles in each annular ring alternately in making sure that each pair of filter elements in the outer two annular rings is cleaned during each complete revolution of the horizontal arm 44.

After receiving the reference signal from the proximity sensor 70, the CPU is programmed to generate output signals on a timed basis that is a function of the above described time required for a revolution of the horizontal arm 44 through a 30° arc, and this timed sequence is determined in a manner that will cause each of the seven valves 48 to be opened at the precise point in time when its corresponding nozzle 46 is located above a pair of openings 22. Thus, in looking at FIG. 6, it will be noted that the innermost valve position #1 will not receive an output signal for a considerable period of time after the "Start of Sequence", namely 6.829 seconds thereafter, and only one such signal is received by the valve at position #1 during the entire sequence. This is because there are a relatively small number of paired openings in the innermost annular ring of openings, and during movement of the horizontal arm 44 through only a 30° angle of movement, the nozzle 46 corresponding to valve position #1 will only pass over one pair of openings 22 after the sequence of operation has commenced. By contrast, the nozzle corresponding to valve position #3 will pass over three additional pairs of openings 22 during the same movement of the horizontal arm 44, and it will be noted that there are three additional pulses shown in FIG. 6 for valve position #3. Accordingly, when the horizontal arm 44 has moved through one complete 30° arc, valve positions 1-3 will have been opened each time the corresponding nozzle 46 is directly above a paired set of openings, and valve positions 4 and 5 and valve positions 6 and 7 will only be operated alternately when their corresponding nozzles 46 pass over alternate pairs of openings 22. When the horizontal arm 44 reaches the end of its 30° arc of movement, which position is indicated by the dotted lines in FIG. 3, the next aperture 66 in the gear plate 36 will be positioned directly beneath the proximity sensor 70, and the proximity sensor 70 will generate a new output signal that is transmitted to the CPU to start a new sequence which will be identical to that shown in FIG. 6 and described above. Thus, in the particular programmed sequence shown in the illustrated embodiment of the present invention, the particular sequence shown in FIG. 6 will repeat itself twelve times during each complete revolution of the horizontal arm 44.

The ability to program the dust collector 10 to operate in the sequence illustrated in FIG. 6 offers significant advantages over conventional dust collectors in which all of the nozzles mounted on a rotating radial arm are operated simultaneously. One particularly significant advantage is the ability to utilize a large number of cleaning elements 24 for a given area of the partition plate 16 to thereby maximize the dust collecting capacity of the dust collector, and reduce its overall size as compared to conventional dust collectors. More specifically, since each of the nozzles 46 can be individually controlled in terms of sequence and frequency of operation, the pairs of openings 22 can be located as close to one another as reentrainment considerations will allow, yet each filter element at each opening 22 can be cleaned once during each 360° rotation of the horizontal arm 44 because the radially outermost nozzles 46 can be operated as frequently as necessary to clean all of the outermost annular ring of openings, even though such nozzles must be operated much more frequently than the nozzles 46 passing over the innermost ring of pairs of openings 22. If, by contrast, all of the nozzles 46 on the horizontal arm 44 were required to be operated simultaneously, as is conventional practice, the number of paired openings 22 in the outermost ring would have to be substantially reduced because only those paired openings which are in radial alignment with the smaller number of paired openings in the innermost ring could be utilized. While this problem is alleviated to some extent by locating the openings in the nozzles in a predetermined pattern as disclosed in the above-mentioned Bosworth patent, the fact that all of the nozzles in the Bosworth patent must be operated simultaneously still limits the number of openings and filter elements that can be utilized in a given surface area for the partition plate.

It is to be expressly understood that the particular programmed sequence illustrated in FIG. 6 is only one of a wide variety of possible programmed sequences that can be used in the dust collector 10 of the present invention to tailor it to a wide variety of different applications. For example, in situations where the transport air is introduced into the dirty air chamber 14 in a direction generally tangential with respect to the circular cluster of filter elements 24, it is quite possible that the outermost ring of filter elements 24 will become dirtier more quickly than the innermost ring of filter elements 24 because of the high concentration of particulate matter in the transport air at the outermost ring of filter elements 24, and this problem can be readily dealt with in the dust collector 10 of the present invention by simply increasing the frequency of operation of the nozzles 46 in the outermost ring without changing the frequency of operation of the nozzles passing over the innermost ring. For example, nozzle positions 6 and 7, rather than being operated alternatively as described above, could be programmed to operate each time a nozzle 46 passes over a pair of openings 22 in the outermost ring of openings, in which case each of the filter elements 24 in the outermost ring would be cleaned twice during each 360° rotation of the mounting arm 44, whereas all of the other filter elements 24 in the other rings would be cleaned only once.

Another significant advantage of the present invention is its ability to reduce reentrainment problems. Since each of the nozzles 46 is individually controlled, the burst of cleaning air which is emitted from adjacent nozzles 46 occurs at different timed intervals, rather than simultaneously, which reduces the possibility of foreign particulate matter which is moved away from a particular filter element 24 by the burst of cleaning air cross-contaminating an immediately adjacent filter element 24. Also, if desired, the nozzles 46 for each annular ring of openings 22 can be located on one radial side of the horizontal arm 44 while the nozzles 46 for an immediately adjacent row of paired openings 22 can be located on the other radial side of the horizontal arm 44. Thus, looking at FIG. 3, it will be noted that nozzle positions 1 and 3 are on one radial side of the horizontal arm 44, and nozzle positions 2 and 4 are on the opposite arm, and, as a result, between each two nozzles on one radial arm there is a substantial spacing because of the intermediate ring of openings 22 which are being cleaned by a nozzle on the other radial side of the horizontal arm 44, all of which assists in reducing reentrainment resulting from cross-contamination of adjacent filter elements 24.

FIG. 7 illustrates an alternate embodiment of the present invention in which an air velocity pressure sensor 78 is mounted on the horizontal arm 44 at a location forwardly of a nozzle 46, the air velocity pressure sensor 78 being positioned with respect to the adjacent nozzle 46 so that it will pass over the center of the opening 22 that is immediately ahead of the opening 22 over which the adjacent nozzle 46 is located. The sensor 78 is carried at this location on a mounting flange 80 fixed to the arm 44, and it may be of any conventional type, such as a pitot tube sensor manufactured by Dwyer Instruments, Inc., in Marietta, Georgia, as Model No. 160-8. In a manner that is well known in the art, this air velocity sensor senses the velocity pressure across the filter element 24 over which it is located, and it generates a pressure signal that is converted into an electrical signal by a conventional pressure transmitter (not shown), which may be, for example, a Model T10-0025 sold by Modus Instruments, Inc., in North Borough, Maine, and this electrical signal is transmitted to the CPU at the control panel 62. As is well known in the art, as particulate matter accumulates on the exterior surface of the filter elements 24, the pressure drop across the filter element 24 increases proportionately. Since the velocity pressure adjacent the filter is a function of the pressure drop across the filter, by measuring the velocity pressure adjacent the filter element 24, the sensor 78 is, in effect, sensing how dirty that particular filter element is, and the CPU at the control panel 62 can be programmed so that when the electrical signal generated by the sensor 78 indicates that the velocity pressure at a particular filter element 24 has reached a predetermined value, it will generate an output signal to the valve 48 associated with that sensor 78 to cause the valve to be opened when its associated nozzle 46 is located directly above the filter element 24 which was determined to have a predetermined velocity pressure thereat. Since each nozzle 46 can be preceded by its own sensor 78, and since the rotational speed of the horizontal arm 44 is known, it is a relatively simple matter for the CPU in the control panel 62 to cause the valve 48 to be opened with a predetermined time delay after receiving the input signal from the sensor 78, such time delay being determined by the amount of time it will take the arm 44 to move sufficiently for the nozzle 46 to be located above the filter element 24 which has been sensed by the sensor 78. While only one sensor 78 is illustrated in the detail view of FIG. 7, it will be understood that a similar sensor 78 could be located adjacent all of the nozzles 46 on the horizontal arm 44, or, if desired, only some of the nozzles 46 can be provided with a sensor 78, while other nozzles 46 are operated by the CPU in a preprogrammed sequence as described in greater detail above.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Apparatus for filtering particulate matter and the like entrained in a transport fluid, said apparatus comprising:
    (a) a housing divided by a partition plate into a dirty fluid chamber and clean fluid chamber, said partition plate having a plurality of openings therein and tubular filter elements depending therefrom into said dirty fluid chamber, and said housing including an inlet to said dirty air chamber and an outlet from said dirty air chamber, whereby said transport fluid will flow into said dirty air chamber, through said filter elements to deposit said particulate matter on the exterior surfaces thereof, and out from said clean air chamber;
    (b) means for cleaning said filter elements at predetermined intervals, said cleaning means comprising:
        (i) a plurality of nozzle means mounted for movement across said partition plate for directing a jet of cleaning air into and through said openings in said partition plate and into said tubular filter elements to create a back flow of cleaning fluid therethrough;
        (ii) a source of pressurized fluid for providing said cleaning fluid to said nozzles;
        (iii) a plurality of electrically operated valve means for selectively connecting said source of cleaning fluid to said nozzles; and
        (iv) control means for operating said valve means for connecting said source of pressurized fluid to said nozzle means at predetermined intervals to form said jet of cleaning air, said control means generating a plurality of electrical control signals that are transmitted to said plurality of electrically operated valve means to operate said plurality of valve means in a preprogrammed sequence to cause said plurality of nozzles to emit said cleaning fluid in a predetermined sequence and to cause at least some of said nozzles to be operated at different timed frequencies, whereby said nozzles will produce jets of cleaning air as they pass over selected ones of said openings in said partition plate during said movement of said nozzles over said partition plate.

2. Apparatus for filtering particulate matter as defined in claim 1, wherein said control means includes a pressure drop sensing means for sensing the pressure drop across said filter elements and generating an output signal when said pressure drop reaches a predetermined maximum value, wherein said pressure drop sensing means is mounted for movement immediately ahead of at least one of said nozzle means, and wherein said programmable operating means operate said valve means for said one nozzle means each time it passes over one of said filter elements that caused said output signal to be generated by said pressure drop sensing means.

3. Apparatus for filtering particulate matter as defined in claim 1, wherein said partition plate is circular and said plurality of nozzle means are mounted for rotational movement across the top surface of said partition plate.

4. Apparatus for filtering particulate matter as defined in claim 3, wherein said openings in said partition plate are arranged in annular patterns so that one of said nozzle means passes over each said opening once during each 360° rotation of said nozzle means.

5. Apparatus for filtering particulate matter as defined in claim 4, wherein said programmable operating means is programmed to transmit said operating signals to said valve means each time each said nozzle means passes over each said opening in said partition plate.

6. Apparatus for filtering particulate matter as defined in claim 4, wherein said programmable operating means is programmed to transmit said operating signals to at least one said valve means each time each said valve means passes over alternate openings in said partition plate.

7. Apparatus for filtering particulate matter as defined in claim 4, wherein each said nozzle means includes a pair of jets adjacent one another at a predetermined spacing, and wherein said openings are arranged in consecutive pairs located in concentric annular rings, and with each said pair of openings having the same spacing therebetween as said spacing between said nozzle jets.

8. Apparatus for filtering particulate matter as defined in claim 7, wherein the center of one opening of each said consecutive pair of openings is equidistant from the center of the other opening in that pair and from the center of one of the openings in the next adjacent annular ring of openings.

9. Apparatus for filtering particulate matter as defined in claim 7, wherein said nozzles are carried on a support extending generally diametrically across said partition plate, said support being mounted for rotation about an axis of rotation extending vertically through the center of said partition plate.

10. Apparatus for filtering particulate matter as defined in claim 9, wherein some of said nozzles are carried on said support on one side of said axis of rotation and some are carried on the other side thereof.

11. Apparatus for filtering particulate matter as defined in claim 9, wherein said source of pressurized fluid is contained in said support, and said valve means are disposed between said support and said nozzles for controlling the flow of said pressurized fluid to said nozzles.

12. Apparatus for filtering particulate matter as defined in claim 1, wherein said partition plate is circular, and wherein said control means includes sensor means for generating an output signal when said nozzle means reaches a predetermined reference point with relation to said partition plate during said movement of said nozzle means over said partition plate.

13. Apparatus for filtering particulate matter as defined in claim 12, wherein a plurality of said reference points are provided, each corresponding to an equal arcuate segment of said circulate partition plate, whereby said sensor means will generate a plurality of output signals during each 360° rotational movement of said nozzle across said partition plate, and wherein said programmable electronic control means generates said plurality of control signals in said predetermined sequence each time one of said output signals is received.

14. Apparatus for filtering particulate matter and the like entrained in a transport fluid, said apparatus comprising:
(a) a housing having a dirty fluid chamber provided with an inlet for receiving said transport air with said particulate matter entrained therein, and having a clean fluid chamber provided with an outlet for discharging said transport fluid after it has been cleaned;
(b) a circular partition plate disposed in said housing to separate said dirty fluid chamber from said clean fluid chamber, said partition plate being formed with a plurality of openings that are arranged in a plurality of concentric annular rings, each said annular ring having a different number of said openings therein, and each said opening having a tubular filter element depending therefrom into said dirty air chamber whereby said transport air will flow from said dirty air chamber and through said filter elements and said openings and into said clean air chamber;
(c) support means extending generally radially across said circular partition plate for rotational movement about an axis of rotation extending through the center of said partition plate, said support means having mounted thereon a plurality of nozzle means positioned so that at least one said nozzle means passes continuously over each said concentric ring of openings in said partition plate, and said nozzle means being formed to direct a jet of cleaning air into said openings;
(d) a source of pressurized cleaning fluid in said nozzle means;
(e) individual valve members associated with each said nozzle means and selectively operable for controlling the flow of said pressurized cleaning fluid to its associated nozzle means; and
(f) control means for opening each said valve means in a predetermined sequence and at different timed frequencies so that said pressurized cleaning fluid will flow from said nozzle means each time each said nozzle means passes over an opening in said concentric ring beneath that particular nozzle mans during said rotational movement of said mounting means over said partition plate.

15. Apparatus for filtering particulate matter as described in claim 14, wherein the number of openings in each said concentric ring of openings increases as the diameter of said concentric ring increases.

16. Apparatus for filtering particulate matter as defined in claim 14, wherein said support means has two arms that extend radially in two opposite directions from said axis of rotation thereof, and wherein some of said nozzle means are mounted on one of said arms and some of said nozzle means are mounted on the other of said arms.

17. Apparatus for filtering particulate matter as defined in claim 14, wherein said openings in each said concentric ring are arranged in a predetermined pattern consisting of a series of pairs of openings arranged at substantially equal circumferential spacing from one another throughout substantially the entire extent of said concentric ring, and wherein each said nozzle means includes a pair of jets positioned to emit cleaning air simultaneously into each said opening in a pair of said openings when said valve means for that nozzle means is opened.

18. Apparatus for filtering particulate matter as defined in claim 17, wherein the center of one opening of each said consecutive pair of openings is equidistant from the center of the other opening in that pair and from the center of one of the openings in the next adjacent annular ring of openings.

19. Apparatus for filtering particulate matter and the like entrained in a transport fluid, said apparatus comprising:
  (a) a housing divided by a partition plate into a dirty fluid chamber and clean fluid chamber, said partition plate having a plurality of openings therein and tubular filter element depending therefrom into said dirty fluid chamber, and said housing including an inlet to said dirty air chamber and an outlet from said dirty air chamber, whereby said transport fluid will flow into said dirty air chamber, through said filter elements to deposit said particulate matter on the exterior surfaces thereof, and out from said clean air chamber;
  (b) means for cleaning said filter elements at predetermined intervals, said cleaning means comprising:
    (i) a plurality of nozzle means mounted for movement across said partition plate for directing a jet of cleaning air into and through said openings in said partition plate and into said tubular filter elements to create a back flow of cleaning fluid therethrough;
    (ii) a source of pressurized fluid for providing said cleaning fluid to said nozzles;
    (iii) a plurality of electrically operated valve means for selectively connecting said source of cleaning fluid to said nozzles; and
    (iv) control means for operating said valve means for connecting said source of pressurized fluid to said nozzle means to form said jet of cleaning air, said control means including a velocity pressure sensor mounted for movement immediately in front of the path of said movement of each said nozzle means, said velocity pressure sensor means sensing the velocity pressure adjacent predetermined filter elements depending from the partition plate openings over which it moves and generating an output signal when said velocity pressure reaches a predetermined value, and including operating means for opening said valve means for each one of said nozzle means each time one of said output signals is received from said sensor means moving in front of that nozzle means whereby a jet of cleaning air is released into the opening at which the predetermined value velocity pressure was sensed by said sensor means.

* * * * *